Jan. 9, 1945.  E. G. ZIMMERMANN  2,366,824
SELF-SEALING STUFFING BOX
Filed April 28, 1943  3 Sheets-Sheet 1
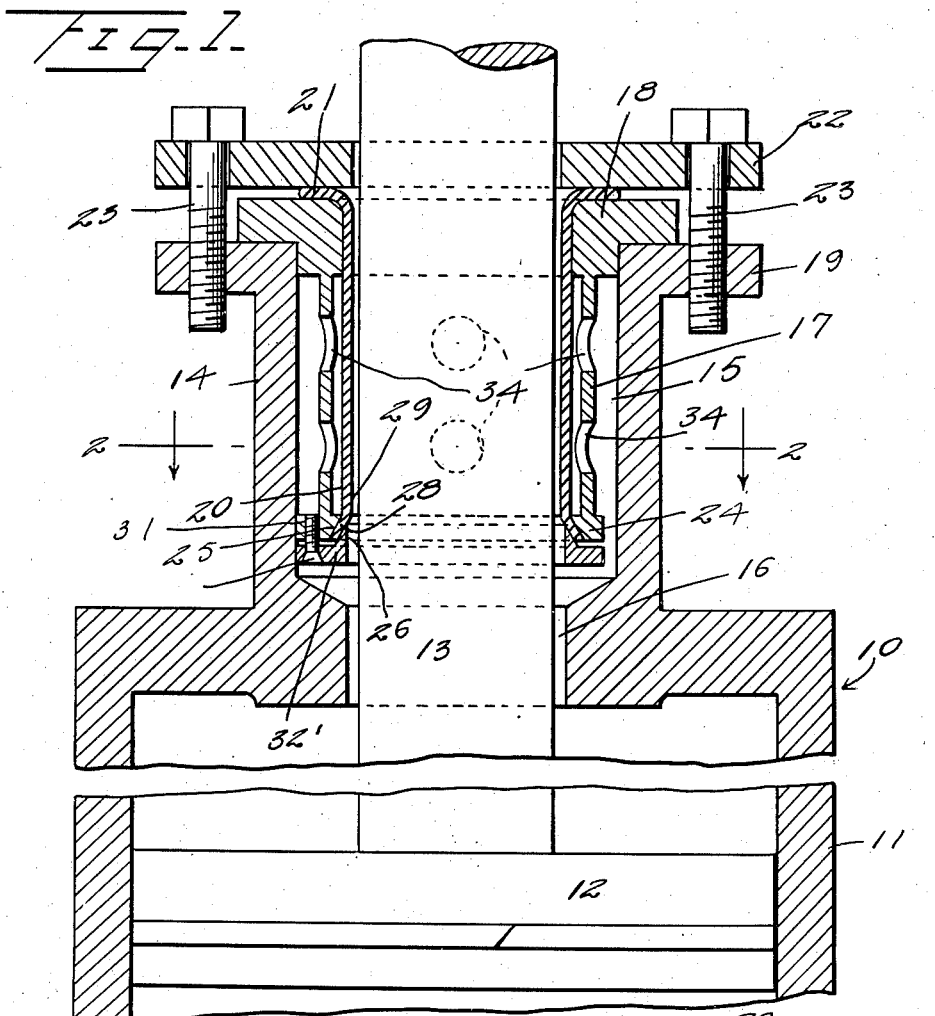
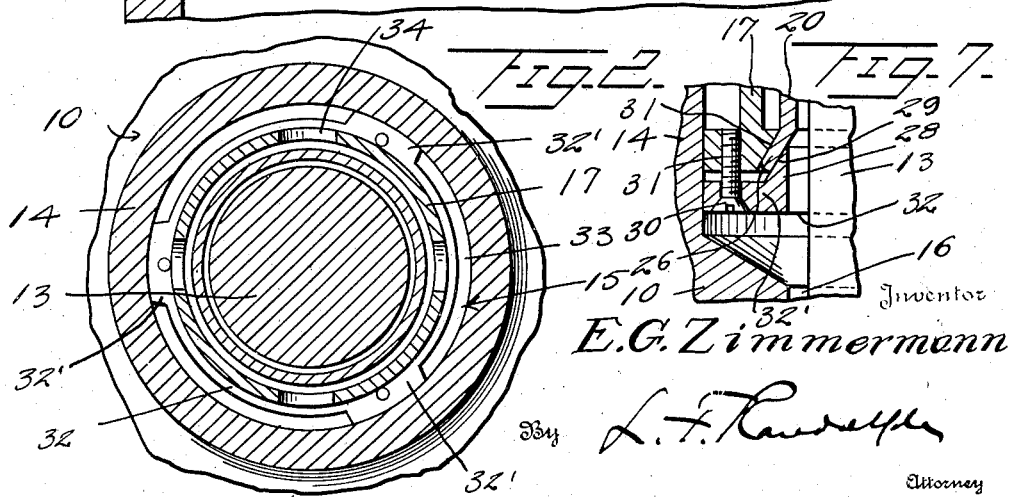
Inventor
E. G. Zimmermann Jan. 9, 1945. E. G. ZIMMERMANN 2,366,824
SELF-SEALING STUFFING BOX
Filed April 28, 1943 3 Sheets-Sheet 2
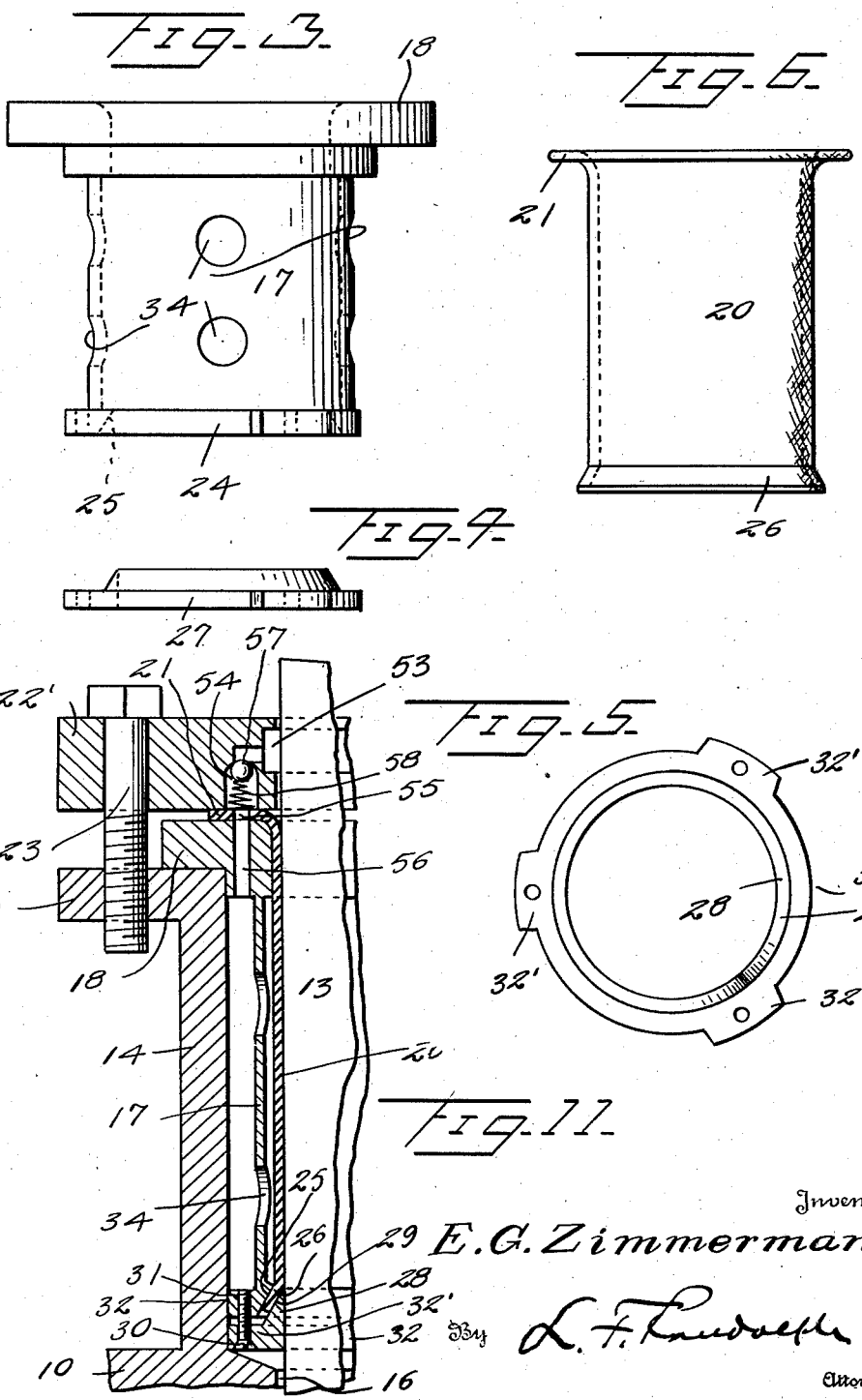

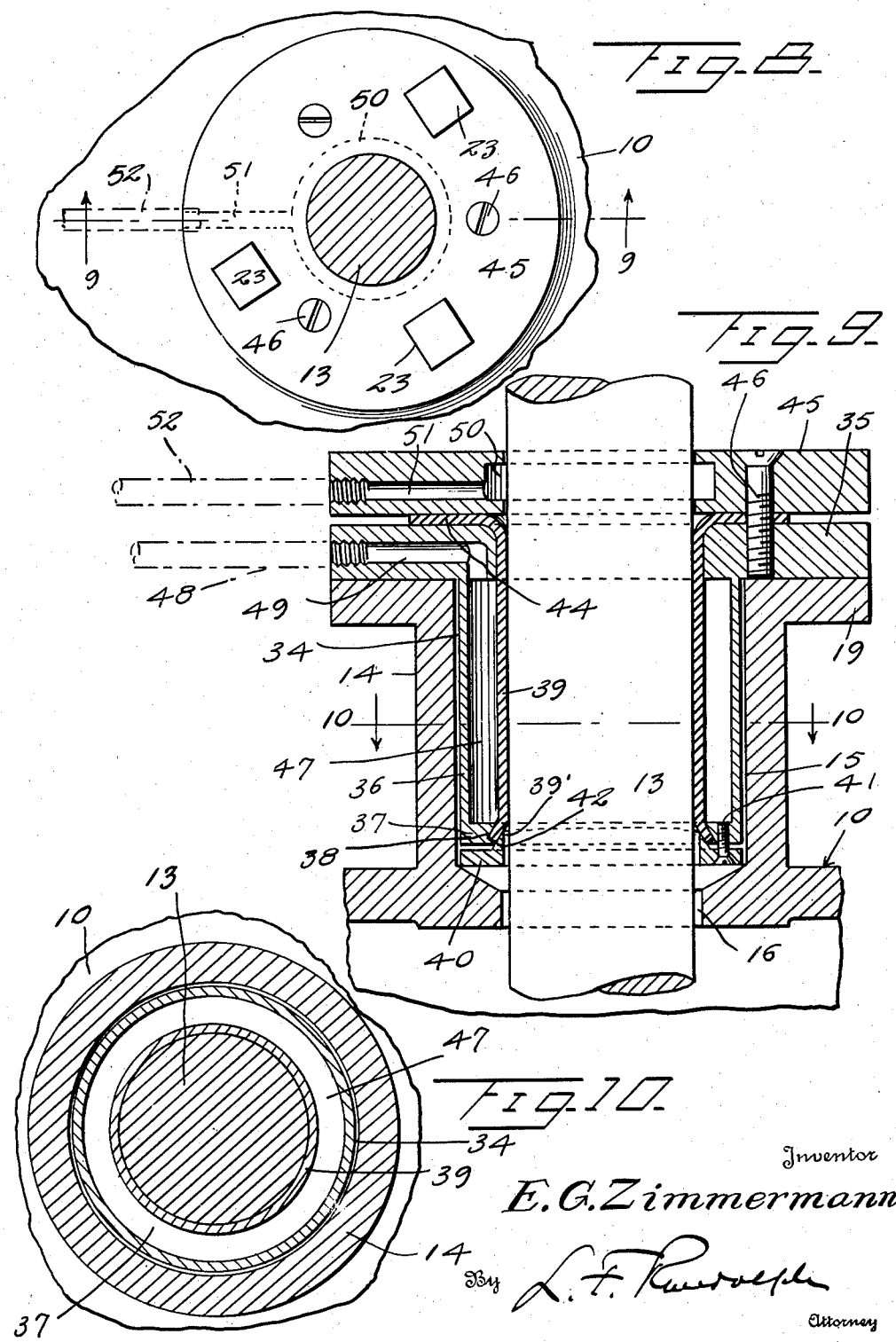

Patented Jan. 9, 1945

2,366,824

UNITED STATES PATENT OFFICE 2,366,824

SELF-SEALING STUFFING BOX

Erich G. Zimmermann, Seattle, Wash.

Application April 28, 1943, Serial No. 484,928

2 Claims. (Cl. 286—26)

This invention relates to a stuffing box particularly applicable to pumps to keep the fluid from escaping around the pump rod.

It is especially aimed to provide a construction employing novel packing which is maintained in engagement with the pump rod to seal the same against escape of fluid along it, by the action of fluid being pumped.

Another object is to provide a structure wherein novel packing is suitably clamped in place in the suffing box with means providing passages for the fluid being pumped to coact with the packing.

In addition, I aim to provide a structure wherein a strong-back secures the operating parts in place and also clamps one free edge of the novel packing.

Further, an aim is to provide a construction wherein the parts of the stuffing box will avoid wear on the pump rod.

Also, I aim to provide a construction wherein the small amount of liquid which may pass a stuffing box effectively will be removed.

The more specific objects and advantages will become apparent from a consideration of the description following taken in connection with accompanying drawings illustrating an operative embodiment.

In said drawings:

Figure 1 is a view in approximately central longitudinal section through a pump employing my novel self-sealing stuffing box, parts being broken away;

Figure 2 is a cross section taken on the line 2—2 of Figure 1;

Figure 3 is a side elevation of the packing cage;

Figure 4 is a side elevation of the ring which clamps the packing to the cage;

Figure 5 is a plan view of said ring;

Figure 6 is a side elevation of a tubular packing element;

Figure 7 is an enlarged detail section particularly showing the clamping of the lower edge of the novel tubular packing between the cage and the clamping ring;

Figure 8 is a plan view of a modified form of stuffing box;

Figure 9 is a view taken approximately on the line 9—9 of Figure 8;

Figure 10 is a horizontal section taken on the line 10—10 of Figure 9; and

Figure 11 is a fragmentary view primarily in central longitudinal section through a final modified form.

Referring specifically to the drawings, my improvements are used especially in connection with pumps to keep the fluid which is being pumped, that is, water, oil, or the like, from escaping along the pump rod. Such a pump generally is shown at 10 in the first form of the invention shown in Figures 1 to 7. Of this conventional pump, a cylinder is shown at 11 having a piston 12 reciprocable therein to pump the fluid and from which piston or plunger 12 the rod 13 extends through a stuffing box housing or sleeve 14 formed integral with the cylinder 11.

Housing 14 is interiorly enlarged to provide a chamber at 15 which is in communication with the pumping space of the cylinder 11 along the shaft or pump rod 13 and through a passage 16 which may be as large relatively to the piston rod as desired.

The chamber 15 accommodates a generally cylindrical cage 17 which surrounds the pump rod 13 and which has a seating ring 18 at one end thereof of L shape in cross section so as to contact an outwardly extending flange 19 at the outer end of housing 14, and partly to extend into the chamber 15.

Carried by the cage 17 is a tubular packing element 20 which may be of leather or of any other suitable flexible material. Such packing sleeve 20 is outwardly flanged at the top at 21 so that it rests on the ring 18. A plate or strong-back 22, through which the pump rod 13 extends, is clamped to the flange 19 by means of screws or bolts 23, for instance passing loosely through openings therein and being screw threaded in openings in the flange 19. By reason of this plate 22 the cage 17 is secured in place and the flange 21 also is clamped in place and sealed at the upper or outer end.

At the lower end cage 17 is enlarged to provide a ring 24 having an interior conical seat 25 against which the lower outwardly extending or conical edge portion 26 of the packing sleeve 20 is disposed and in which position it is clamped by a ring 32' having a flange 28 which extends into the sleeve 26 and has a conical or inclined surface 29 in direct clamping engagement with the flange 26 of the packing sleeve. Ring 27 is secured in place under the desired pressure through the medium of screws 30 passing loosely therethrough and engaging screw-threaded openings 31 in spaced-apart lugs 32 extending outwardly from the base of the cage and between which passages 33 are provided to enable fluid to enter the chamber 15 and then pass through openings 34 to the interior of the cage 17 so as to exert its pressure directly against the packing 20 to contact it and seal it against the plunger rod 13. As a result, during pumping operations a portion of the fluid being pumped will pass along the pump rod 13 through the bore or passage 16 into chamber 15, thence through openings 34 and into direct contact with the packing sleeve 20, and under the requisite pressure contacting the latter with the reciprocating pump rod 13 in order to seal the joint and prevent the escape of the fluid from the pump along the pump rod.

Various changes may be resorted to provided that they fall within the spirit and scope of the invention. For instance, I may use the form in Figures 8 to 10. In this form the pump fragmentarily shown is a conventional structure and may be identical with that employed at 10, the parts 13, 14, 15, 16, 19, and 23 being identical in construction and operation with the same parts of the previously described form. The cage in this form generally is designated 34, consisting of a plate 35 in contact with or seated on the flange 19 and having a cylindrical wall 36 extending integrally therefrom into the chamber 15, and terminating in an inwardly extending flange 37 having a tapered seat at 38 which is engaged by the tapered extremity 39 of a leather or other flexible fluid-impervious sleeve of packing material like that at 20. The extremity 39 is clamped tightly to the seat by a ring 40 detachably connected to the flange 37 by screws or bolts at 41. Clamping ring 40 has an extension 42 provided with a tapered seat in direct engagement with the extremity 39.

At the upper end the packing sleeve 39 has an outwardly extending flange 44 seated on the upper surface of the plate 35. In turn, seated on top of the flange 44 and plate 35 is a strongback or plate 45. Plates 35 and 45 may be secured together by screws or bolts 46 and in turn they may be secured to the flange 19 by the bolts 23.

The present form of the invention provides a chamber or space at 47 which is filled with the fluid being pumped and in communication with the discharge or pressure end of the pump through a conduit 48 detachably coupled to the plate 35 in line with passage 49 therein communicating with the space 47. The pressure of the fluid in chamber 47 causes intimate contact of the packing 39 with the rod 13 to seal the same. However, a small film of fluid may adhere to the rod 13 and pass the packing 39 which will accumulate in an annular space 50 of plate 45 around the rod 13. Such space 50 through a passage 51 in the plate, is in communication with a conduit 52 connected to suction end of the pump in order to remove such slight accumulation, or pipe 52 may be an ordinary drainpipe to permit the accumulation to run off.

Another modification is suggested in Figure 11. This modification conforms to a basic structure of Figures 1 to 10, and accordingly the same reference numerals have been applied to the parts thereof. This modified form is designed to remove such film or accumulation of the fluid being pumped which passes the packing 20, the same accumulating within a space 53 provided in the strongback or plate 22' which is the equivalent of that used at 22. In communication with space or chamber 53 are passages 54 in the plate 22', an opening or port 55 through the packing 20 and a passage 56 through the plate 18, leading to the space 15. Passage 54 normally is closed by a ball valve 57 urged to closed position by an expansive coil spring 58. With this structure the small amount of fluid accumulating in the annular space 53 will be returned to the chamber 15 when the piston descends on a suction stroke due to the suction created as the valve 57 will open. Such valve closes on the up or pressure stroke.

I claim as my invention:

1. A stuffing box comprising packing adapted to surround a pump rod, a cage having a mounting head overlapped by one end of the packing, said cage having a perforated cylinder surrounding the packing, a ring to clamp the other end of the packing to one end of the cylinder, the last-mentioned end of the cylinder and clamping ring having inclined surfaces engaging the adjacent end of the packing, and spaced-apart lugs on the cylinder to which said ring is secured.

2. A stuffing box of the class described having tubular packing adapted to surround a pump rod, a cage mounting said packing and providing a chamber about the same and provided with a plate, means to connect the chamber with the discharge end of a pump through said plate whereby it will be filled with fluid under pressure to maintain the packing in engagement with a pump rod which it surrounds, a second plate, one end of the packing being disposed between the plates, means securing the plates together to clamp said end of the packing between them, the second-mentioned plate having a space for accumulation of fluid therein which passes the packing, and means for the discharge of said fluid from the space.

ERICH G. ZIMMERMANN.